US008659654B2

(12) United States Patent
Tsang et al.

(10) Patent No.: US 8,659,654 B2
(45) Date of Patent: Feb. 25, 2014

(54) IMAGE VERIFICATION WITH TIERED TOLERANCE

(75) Inventors: Michael Y. Tsang, Redmond, WA (US); Xu Yang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1849 days.

(21) Appl. No.: 11/548,563

(22) Filed: Oct. 11, 2006

(65) Prior Publication Data

US 2008/0091365 A1   Apr. 17, 2008

(51) Int. Cl.
*H04N 7/18* (2006.01)
(52) U.S. Cl.
USPC ........... 348/130; 348/129; 382/149; 382/150; 382/152; 382/167
(58) Field of Classification Search
USPC ........... 348/129–130; 382/149–150, 152, 167
See application file for complete search history.

(56) References Cited

U.S. PATENT DOCUMENTS

| | | | |
|---|---|---|---|
| 4,598,324 A | | 7/1986 | Efron et al. |
| 5,412,423 A | * | 5/1995 | Ohashi ........................ 348/234 |
| 6,504,494 B1 | * | 1/2003 | Dyas et al. .................... 341/50 |
| 6,714,594 B2 | | 3/2004 | Dimitrova et al. |
| 6,906,743 B1 | | 6/2005 | Maurer |
| 6,941,014 B2 | * | 9/2005 | Lin et al. ...................... 382/176 |
| 6,990,246 B1 | | 1/2006 | Ferguson |
| 7,076,101 B2 | * | 7/2006 | Chung et al. ................. 382/218 |
| 7,525,702 B2 | * | 4/2009 | Guleryuz ..................... 358/518 |
| 7,995,839 B2 | * | 8/2011 | Tanaka et al. ................ 382/167 |
| 8,351,696 B2 | * | 1/2013 | Lukac .......................... 382/167 |
| 2003/0051256 A1 | | 3/2003 | Uesaki et al. |
| 2003/0220838 A1 | | 11/2003 | Ishii et al. |
| 2005/0129278 A1 | | 6/2005 | Rui et al. |
| 2006/0023942 A1 | * | 2/2006 | Guleryuz ...................... 382/167 |
| 2006/0210191 A1 | * | 9/2006 | Silverstein .................... 382/275 |
| 2007/0025482 A1 | * | 2/2007 | Wells et al. ................... 375/355 |
| 2008/0091365 A1 | * | 4/2008 | Tsang et al. .................... 702/71 |
| 2011/0194764 A1 | * | 8/2011 | Park et al. ..................... 382/167 |
| 2012/0294526 A1 | * | 11/2012 | Yasan et al. ................... 382/167 |

FOREIGN PATENT DOCUMENTS

| | | |
|---|---|---|
| WO | 9706502 A1 | 2/1997 |
| WO | 02084990 A2 | 10/2002 |

OTHER PUBLICATIONS

Doulamis et al., "Efficient Summarization of Stereoscopic Video Sequences," IEEE Transactions on Circuits and Systems for Video Technology, vol. 10, No. 4, 2000, pp. 501-517, IEEE, USA.
Sikora, Thomas, "The MPEG-4 Video Standard Verification Model," IEEE Transactions on Circuits and Systems for Video Technology, vol. 7, No. 1, 1997, pp. 19-31, IEEE, USA.
Sun et al., "Trifocal Motion Modeling for Object-Based Video Compression and Manipulation," IEEE Transactions on Circuits and Systems for Video Technology, vol. 8, No. 5, 1998, pp. 667-685, IEEE, USA.

* cited by examiner

*Primary Examiner* — Duyen Doan
(74) *Attorney, Agent, or Firm* — Sung Kim; Andrew Sanders; Micky Minhas

(57) ABSTRACT

Comparing a sample image to a reference image. Differences between the color channel values of the pixels in the sample image and the corresponding color channel values for the corresponding pixels in the reference image are calculated and compared to predefined tolerances. Based on the comparisons, a pixel status for the pixels in the sample image is defined. An image status indicating whether the sample image differs from the reference image is defined based on the defined pixel status.

14 Claims, 3 Drawing Sheets

IMAGE VERIFICATION WITH TIERED TOLERANCE

BACKGROUND

Video is currently being generated by numerous software applications for display on a variety of computing devices. Video verification is often performed by software developers to gauge the quality of the generated video. Existing video verification methods include double-blind testing of participants in controlled settings. Other existing methods are automated. For example, in one method, every frame of a subject video clip is compared to frames from a known, good, reference video clip. Hardware limitations in existing computing devices limit the feasibility of this computationally complex method.

Other existing methods sample video frames from a video clip and compare the sampled frames to corresponding frames from the reference video clip. These methods, however, are limited in that existing frame comparison techniques only identify frame-level differences and ignore more subtle differences such as color tone and pixel-level detail. Further, most existing sampling techniques collect samples equally spaced in time thus limiting the sample set and reducing the efficacy of the verification.

Existing video verification methods further produce frequent false negatives which must be resolved through human review. For example, different graphics card drivers may render the same video clip with slight shading differences. Even though the shading differences may not be perceptible to human eyes, existing video verification techniques will flag the video clips as different if enough of the frames within the clip exhibit such shading differences.

Further, existing sampling techniques limit the quality of the sample set. With existing sampling techniques, there is an inability to verify particular content with equally spaced time samples. For example, titles and credits typically only appear at the beginning and/or end of a video clip and are thus hard to sample with existing sampling techniques. Additionally, transitions between clips and color tone effects such as sepia and grayscale are difficult to sample with existing sampling techniques.

SUMMARY

Embodiments of the invention compare a sample image to a reference image. In an embodiment, the invention determines whether the sample image differs from the reference image within a particular tolerance. For one or more pixels in the sample image, differences in one or more color channel values are calculated with respect to the corresponding pixels in the reference image. Based on the calculated color channel differences and the tolerance, a pixel status is defined for each of the pixels. Based on the pixel status for each of the pixels, an image status is defined indicating whether the sample image differs from the reference image within the tolerance.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

In an embodiment, the invention compares a first image with a second image to enable users such as application developers to verify generated images with known, good reference images. For example, a video card manufacturer may wish to test a newly-developed video graphics card by comparing test content rendered by the new card with the test content rendered by a known, good card. Aspects of the invention reduce or eliminate "false negatives" that result from existing image verification algorithms. In doing so, the amount of manual user input (e.g., manual, visual comparison of the images) is reduced, resulting in a time savings during development.

In particular, embodiments of the invention provide a tiered tolerance mechanism to account for slight rendering variations between images at the bitmap, pixel, and color channel levels. Tolerance thresholds are applied to each of the bitmap, pixel, and color channel levels. In addition, aspects of the invention include intelligent sampling when comparing video clips. Intelligent sampling comprises targeting a sampling range, pseudo-random sampling, and variable sampling frequency.

Figure 1:
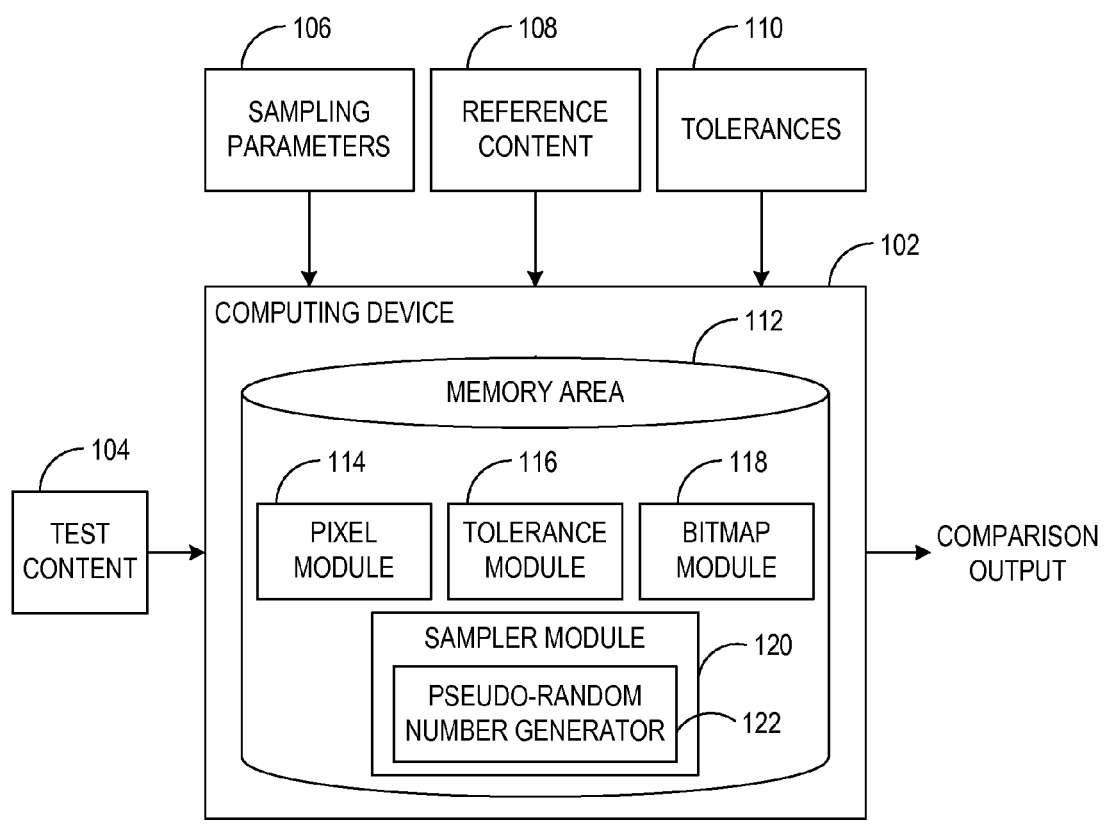
FIG. 1 is an exemplary block diagram illustrating an implementation of a video verification system according to an embodiment of the invention.

Referring first to FIG. 1, an exemplary block diagram illustrates an implementation of a video verification system according to an embodiment of the invention. A computing device 102 receives test content 104 (e.g., input images or input video content) and has access to one or more sampling parameters 106, reference content 108 (e.g., reference image or reference video content), and one or more tolerances 110. The computing device 102 outputs the results of comparing the test content 104 to the reference content 108.

The computing device 102 has access to a memory area 112 such as a computer-readable medium. While shown in FIG. 1 as being part of the computing device 102, the memory area 112 may also be located separately or remotely from the computing device 102. In an embodiment, the memory area 112 represents one or more computer-readable media having computer-executable components for comparing images generated by different video adapters. Each of the images has a plurality of pixels associated therewith. In FIG. 1, the components include a pixel module 114, a tolerance module 116, a bitmap module 118, and a sampler module 120. The pixel module 114 compares characteristics of one or more of the pixels in a sample image generated by a first video adapter with corresponding pixels in a reference image generated by a second video adapter. For example, the characteristics include one or more color channel values. In an embodiment, only a selected subset of the pixels in the sample image are compared to the corresponding pixels in the reference image. Such an embodiment has reduced computational complexity, among other features. The tolerance module 116 defines a pixel status for each of the pixels in the sample image based on the compared characteristics and tolerances 110 associated therewith. The bitmap module 118 defines an image status for the sample image based on the pixel status defined by the tolerance module 116 for each of the pixels in the sample image.

The sampler module 120 samples reference video content based on sampling parameters 106 to create one or more reference images, and samples test video content based on the sampling parameters 106 to create one or more sample images. For example, the sampler module 120 includes a pseudo-random number generator 122 for generating a set of samples from the input video content.

In an embodiment, there are one or more color channels within each pixel. In such an embodiment, the pixel module 114 in FIG. 1 includes a color channel module (not shown). The color channel module compares one or more of the color channel values of each pixel in a sample image generated by a first video adapter with corresponding color channel values of the corresponding pixel in a reference image generated by a second video adapter. In an embodiment, only a selected subset of the color channels in the pixels in the sample image are compared to the corresponding color channels in the corresponding pixels in the reference image. The tolerance module 116 defines a pixel status for each of the pixels in the sample image based on the color channel values compared by the color channel module.

Figure 3:
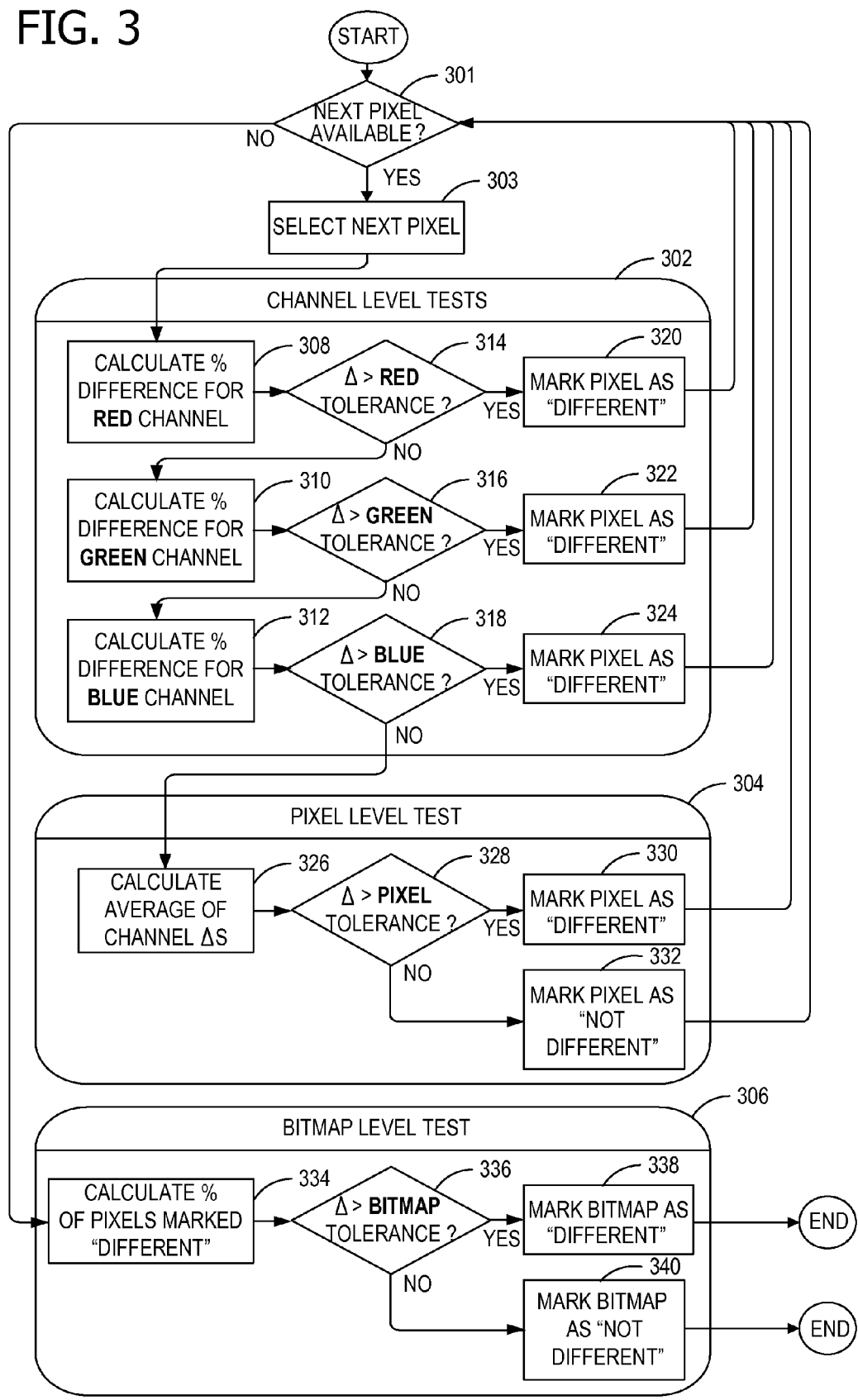
FIG. 3 is an exemplary flow chart illustrating the channel level tests, pixel level test, and bitmap level test of an embodiment of the invention.

In yet another embodiment, the tolerance module 116 provides tolerance thresholds for each of the bitmap, pixel, and color channel levels (e.g., see FIG. 3). For example, the tolerance module 116 provides a tolerance value to use when comparing color channel values, a tolerance value to use when comparing pixels, and a tolerance value to use when comparing the overall bitmaps. Such a tiered tolerance system improves existing video verification systems.

FIG. 1 shows one example of a general purpose computing device 102. The computing device 102 has one or more processors or processing units and system memory. Aspects of the invention include the computing device 102 itself when programmed according to the methods and techniques described herein. The computing device 102 typically has at least some form of computer readable media. Computer readable media, which include both volatile and nonvolatile media, removable and non-removable media, may be any available medium that may be accessed by the computing device 102. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, the computing device 102 executes computer-executable instructions such as those illustrated in the figures to implement aspects of the invention. The computer-executable instructions are stored on one or more computer-readable media.

Figure 2:
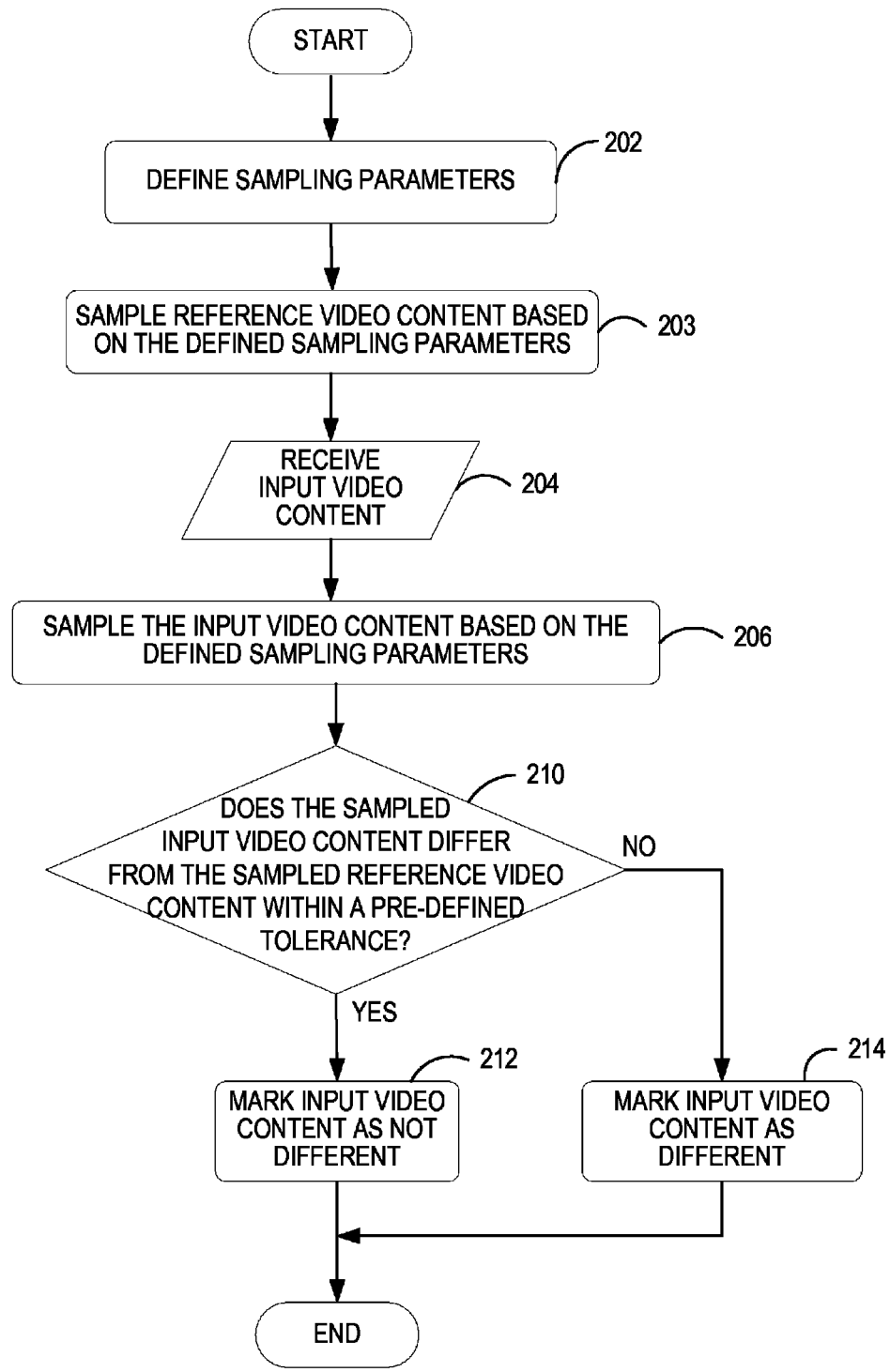
FIG. 2 is an exemplary flow chart illustrating operation of the video verification system according to an embodiment of the invention.

Referring next to FIG. 2, an exemplary flow chart illustrates operation of the video verification system illustrated in FIG. 1 for comparing video content. At 202, one or more sampling parameters are defined (e.g., sampling parameters 106 in FIG. 1). The reference video content is sampled at 203 based on the defined sampling parameters. Input video content is received at 204. The received video content is sampled at 206 based on the defined sampling parameters. For example, defining the sampling parameters includes identifying a seed for a pseudo-random number generator (e.g., pseudo-random number generator 122 in FIG. 1). The pseudo-random number generator generates random samples that are repeatable using the seed. The pseudo-random number generator uses the identified seed to produce one or more corresponding values to be used as timestamps for sampling both the input video content and the reference video content. Sampling the input video content and the reference video content produces samples (e.g., frames). The same seed is used as input to the pseudo-random number generator when operating on the input video content and the reference video content to produce the corresponding samples. In an embodiment, sampling the received input video content produces a plurality of sample images and sampling the reference video content produces a plurality of reference images. Each of the plurality of reference images corresponds to one of the plurality of sample images. A different set of sample images and reference images may be generated by using a different seed for the pseudo-random number generator.

At 210, the sampled input video content is compared to the sampled reference video content to determine if there is a difference within at least one pre-defined tolerance (e.g., as a function of a tolerance value). If the difference is within the pre-defined tolerance, the input video content is marked as "not different" at 212. If the difference exceeds the pre-defined tolerance, the input video content is marked as "different" at 214.

Each of the sample images and the reference images comprise at least one pixel. Each pixel has one or more color channel values associated therewith. In an embodiment, determining whether the sampled video content differs from the sampled reference content includes calculating a color channel difference between a color channel value of a pixel in one of the sample images and the corresponding color channel value for a corresponding pixel in the corresponding reference image. Further, the calculated color channel difference is compared to a predefined color channel tolerance. A pixel status is defined for the pixel in the sample image as a function of this comparison. In an embodiment, only a single color channel value is analyzed. In other embodiments, a plurality of color channels is analyzed. For example, the color channel values may correspond to one or more of the following: red, green, blue, luminance, chrominance, color-red, and color-blue. The color channel differences represent a mathematical difference in values for each of the color channels, along with differences in nature, form, and quality of the color channel components.

In an embodiment, determining whether the sampled video content differs from the sampled reference content includes calculating color channel differences between the color channel values of a pixel in the sample image and the color channel values of a corresponding pixel in the reference image. The calculated color channel differences for the pixel in the sample image are statistically combined (e.g., averaged) and compared to a predefined pixel tolerance. A pixel status of the pixel in the sample image is defined accordingly.

In an embodiment, a targeted sampling range may be identified by defining the sampling parameters. By controlling the sampling range within the input video content, particular types of video content (e.g. titles and credits) may be properly verified. For example, the input video content may include a video clip having text overlay. The sampling parameters may be defined such that sampling occurs at the beginning of the video clip to enable sampling of the portion of the video clip that includes the text overlay.

For example, the text overlay may include a title or credits. A title under the context of video includes an overlay of text animated over the start of a video clip (e.g. at the start of a home movie, the text "Family vacation" flies in from the right, remains at the center of the screen for 0.5 second, then flies out to the left). The entire duration of the title may be slightly under 1 second. Existing sampling algorithms collect samples every 1 second, and as such would miss the entire duration of the title. The titling animation is never properly verified with such existing sampling algorithms because there are no video frame samples during the time when the title is being animated.

In general, the sampling range may be defined such that sampling occurs anywhere in a piece of video content (e.g., to verify transitions or credits). In an example, the sampling range is defined such that sampling occurs towards the end of a video to verify credits.

With aspects of the current invention, a targeted sampling range may be defined to enable generation of samples (e.g., frames) that include the text overlay. For example, the sampling parameters may be defined to only collect samples between 0 and 1 second so that the samples will cluster around the time when the title is animated.

Another sampling technique in an embodiment of the invention includes defining a variable sampling frequency. Placing a lower limit on sampling frequency based on video length (e.g., a higher sampling frequency for shorter video) produces a statistically significant quantity of samples for videos of all lengths. The statistically significant quantity of samples provides increased confidence in the sample population. Exemplary video lengths and corresponding lower limits are shown in Table 1 below.

TABLE 1

Exemplary Video Lengths and Corresponding Lower Limits on Sampling.

| Video Length | Maximum Sample Space |
|---|---|
| Shorter than 10 seconds | 0.5 seconds |
| Shorter than 1 minute | 3 seconds |
| Shorter than 1 hour | 1 minute |
| Longer than 1 hour | 2 minutes |

Aspects of the invention use one or more of the intelligent sampling techniques described herein to enhance the confidence of bitmap comparisons for particular types of video content. The intelligent sampling techniques include, but are not limited to, targeted sampling, pseudo-random sampling, and variable frequency sampling.

The intelligent sampling aspects of the invention may be implemented through a sampling data file that includes, for example, the following information: one or more sets of targeted sampling range (e.g., each set includes a start time and an end time), a seed value for generating a pseudo-random series of timestamps when samples are to be taken, and one or more sets of sampling specification specifying the minimum sampling frequency and the corresponding maximum video length. An exemplary sampling data file is shown in Appendix A. The example in Appendix A specifies a maximum sample space (e.g., minimum sampling frequency). In an embodiment, a minimum sample space (e.g., maximum sampling frequency) may be specified.

Referring next to FIG. 3, an exemplary flow chart illustrates the channel level tests, pixel level test, and bitmap level test of an embodiment of the invention. The tolerance values and comparisons shown in FIG. 3 implement a tiered tolerance aspect of an embodiment of the invention. For example, there are tolerance values and comparisons in each of the channel level tests 302, pixel level test 304, and bitmap level test 306. The operations in FIG. 3 generally compare a sample image to a reference image, such as frames from a video clip. The sample image and the reference image each have a plurality of pixels. The operations in FIG. 3 execute iteratively on each of the pixels at 301, 303. The channel level tests 302 may operate on each pixel sequentially or in parallel (e.g., via a forked process, multi-threaded application, object-oriented process instantiation, distributed computing, or the like). Each of the plurality of pixels has at least one color channel value associated therewith. The comparison in FIG. 3 includes channel level tests 302, a pixel level test 304, and a bitmap level test 306. The channel level tests 302 include calculating a color channel difference (e.g., a percentage difference, or delta A) between one or more of the color channel values of one or more of the pixels in the sample image and the corresponding color channel values for the corresponding pixels in the reference image at 308, 310, 312. The calculated color channel difference is compared to a predefined color channel tolerance at 314, 316, 318. A pixel status of each of the one or more of the pixels in the sample image is defined at 320, 322, 324 as a function of the comparing 314, 316, 318. In an embodiment (not shown), the pixel level test 304 is absent and an image status of the sample image is defined as a function of the defined pixel status of each of the one or more pixels in the sample image (e.g., at 320, 322, 324). For example, the pixel may be marked as "different."

The pixel level test 304 includes statistically combining the calculated color channel differences (e.g., calculating the average of the color channel differences at 326). Statistically combining the calculated color channel differences includes, but is not limited to, one or more of the following: determining an average for the calculated color channel differences, and determining a median for the calculated color channel differences. The statistically combined color channel differences are compared to a predefined pixel tolerance at 328. A pixel status of each of the pixels in the sample image is defined at 330, 332 as a function of the comparison at 328. For example, the pixel may be marked as "different" or "not different."

After all of the pixels have been evaluated (e.g., no additional pixels are available at 301), the bitmap level test 306 includes calculating at 334 a percentage of pixels marked "different" by the channel level tests 302 and the pixel level test 304. If the calculated percentage exceeds a pre-defined bitmap tolerance at 336, the bitmap is marked "different" at 338. If the calculated percentage is within the pre-defined bitmap tolerance at 336, the bitmap is marked "not different" at 340.

The channel level tests 302, the pixel level test 304, and the bitmap level test 306 are part of a tiered tolerance mechanism that increase the overall confidence in the image comparison process by addressing different sources of potential false negatives (e.g., pixel color tone, pixel shading, and bitmap region).

In an embodiment, some of the color channel differences may be effectively removed from the image comparison process by setting the color channel tolerances appropriately. This allows the developer to focus and scope the verification process. For example, the user would set the tolerance for the color channel(s) of no interest to a high value and the tolerance for the color channel(s) of interest to a low value. As such, the calculated differences for the color channel(s) of no interest do not exceed the pre-defined tolerance (and hence the pixel is not marked "different"). In an embodiment, the tolerances are included with the sampling parameters (e.g., in a sampling data file).

An example of the operations in FIG. 3 follows. In the hypothetical example, a first image exhibits a 3% uniform brightness difference compared to a second image (e.g., every single pixel in the first image is 3% darker than the corresponding pixel in the second image). To human eyes, these images appear to be only slightly different, and are by no means different to the extent that they should fail a video rendering test. Using existing comparison algorithms that count the number of different pixels, however, these two images would result in a 100% difference and thus be marked as different images in the image comparison test.

Aspects of the invention provide tolerance factors (e.g., at the bitmap level test 306, pixel level test 304, and channel level tests 302) to eliminate false negatives such as in the example above. In the above example, instead of counting the overall number of pixels that are different, a tolerance factor is allowed for each pixel. If a pixel in one image is different from the corresponding reference pixel in another image, but within the tolerance factor (e.g., 6%), the pixel in the one image is considered to be the same as the corresponding pixel in the other image. By applying operations such as in FIG. 3, every pixel in the above example is considered to be the same as the corresponding reference pixel and the test will pass. Similarly, the channel level tolerance allows for slight color tone differences that are imperceptible by human eyes.

At the bitmap level, a tolerance factor accounts for regional differences between two video frames. If only the pixels depicting, for example, clouds at the top-rightmost corner of the frame are slightly different between the two images, but their differences exceed the tolerance factors at the pixel and channel levels, the images would be considered different under existing image comparison algorithms (e.g., the comparison test fails). By allowing a bitmap tolerance factor, a pre-determined number of pixels may be different (beyond tolerance factors at the pixel and channel levels) and the test passes.

In an example of a channel level test 302, a reference pixel value (e.g., for the red channel) equals 168 and the test pixel value equals 163. The percentage difference between these pixel values for the red channel is shown in equation (1) below.

$$\text{Percentage difference} = |(163-168)|/256 \times 100 = 1.95\% \tag{1}$$

In an embodiment, if any one channel's percentage difference is greater than its pre-defined tolerance factor, then the pixel is marked as "different" and testing of any remaining color channels is omitted (e.g., for efficiency).

Furthering the example, if all the color channels' differences are within their corresponding tolerance factors, then the pixel level test 304 is performed by calculating the average percentage difference across all the color channels and comparing that value to the pixel's pre-defined pixel level tolerance factor. If the red, green, and blue channel percentage differences are 1.95%, 0.87%, and 2.16%, respectively, the sample equation for the pixel level test 304 is shown in equation (2) below.

$$\text{Average difference} = (1.95+0.87+2.16)/3 = 1.66\% \tag{2}$$

If the average difference is within the pixel's pre-defined tolerance factor, then the pixel is marked as "same" or "not different." Otherwise, the pixel is marked as "different."

After all the pixels have been processed, the percentage of pixels that are marked "different" is calculated in the bitmap level test 306. In an example, if the video resolution is 640×480 and the number of pixels marked as "different" equals 17,985, the percentage difference is calculated via equation (3) below.

$$\text{Percentage difference} = 17,985/(640 \times 480) \times 100 = 5.85\% \tag{3}$$

If the calculated percentage difference is greater than the bitmap level tolerance factor, the test reports a failure for the current video frame under test. Otherwise, the test reports a pass for the current video frame under test.

Embodiments of the invention may be described in the general context of computer-executable instructions, such as program modules or components, executed by one or more computers or other devices. Generally, program modules or components include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having"

are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Appendix A

Listed below is an example of a sampling data file for a five-second video clip. The seed listed below for sampling is input to a pseudo-random number generator. The psuedo-random number generator outputs a sequence of samples based on the seed. Time units are in seconds

```
<Video>
    <Type>Title</Type>
    <Name>Fly In, Fly Out</Name>
    <Sampling Range>
        <Start Time>0.00</Start Time>
        <End Time>1.00</End Time>
    </Sampling Range>
    <Sampling Range>
        <Start Time>4.00</Start Time>
        <End Time>4.97</End Time>
    </Sampling Range>
</Video>
<Video>
    <Type>Effect</Type>
    <Name>3D Ripple</Name>
    <Sampling Range>
        <Start Time>0.00</Start Time>
        <End Time>4.75</End Time>
    </Sampling Range>
</Video>
<Video>
    <Type>Transition</Type>
    <Name>Fade In From Black</Name>
    <Sampling Range>
        <Start Time>0.00</Start Time>
        <End Time>2.50</End Time>
    </Sampling Range>
</Video>
<Sampling>
    <Seed>174865</Seed>
    <Samples>
        <Video Length>1</Video Length>
        <Max Space>0.1</Max Space>
    </Samples>
    <Samples>
        <Video Length>5</Video Length>
        <Max Space>0.25</Max Space>
    </Samples>
    <Samples>
        <Video Length>60</Video Length>
        <Max Space>3</Max Space>
    </Samples>
    <Samples>
        <Video Length>600</Video Length>
        <Max Space>20</Max Space>
    </Samples>
    <Samples>
        <Video Length>3600</Video Length>
        <Max Space>60</Max Space>
    </Samples>
</Sampling>
```

What is claimed is:

1. A method for comparing a sample image to a reference image, said sample image and said reference image each having a plurality of pixels, each of said plurality of pixels having at least one color channel value associated therewith, said method comprising:

calculating a color channel difference between one or more of the color channel values of one or more of the pixels in the sample image and the corresponding color channel values for the corresponding pixels in the reference image;

comparing the calculated color channel difference to a predefined color channel tolerance;

statistically combining the calculated color channel differences;

comparing the statistically combined color channel differences to a predefined pixel tolerance;

defining a pixel status of each of the one or more of the pixels in the sample image as a function of comparing color channel differences to a tolerance and statistically combined color channel differences to a tolerance, said pixel status indicating whether the pixel in the sample image is different from the corresponding pixel in the reference image; and defining an image status of the sample image as a function of calculating a percentage of the pixels with a pixel status indicating that the pixel in the sample image is different from the corresponding pixel in the reference image, said image status indicating the sample image is different from the reference image when the calculated percentage exceeds a pre-defined bitmap difference tolerance between the sample image and the reference image.

2. The method of claim 1, wherein statistically combining the calculated color channel differences comprises one or more of the following: determining an average for the calculated color channel differences, and determining a median for the calculated color channel differences.

3. The method of claim 1, wherein the predefined color channel tolerance is associated with one or more of the color channel values.

4. The method of claim 1, wherein defining the pixel status comprises indicating whether each of the one or more pixels in the sample image differs from the corresponding pixel in the reference image.

5. The method of claim 1, wherein the sample image comprises a sample video frame.

6. The method of claim 1, wherein the color channel values correspond to one or more of the following: red, green, blue, luminance, chrominance, color-red, and color-blue.

7. The method of claim 1, wherein one or more computer-readable media not including a signal have computer-executable instructions for performing the method of claim 1.

8. A method of comparing video content, said method comprising:

defining one or more sampling parameters; wherein defining one or more sampling parameters comprises identifying a seed for a pseudo-random number generator;

receiving video content as input, wherein receiving the input video content comprises receiving a video clip with a corresponding text overlay;

sampling the received input video content based on the defined sampling parameters, wherein said sampling occurs at a timestamp generated by the pseudo-random generator using the seed;

sampling reference video content based on the defined sampling parameters, wherein said sampling occurs at the generated timestamp; and determining whether the sampled input video content differs from the sampled reference video content within a tolerance,
wherein sampling the received input video content produces a plurality of sample images and sampling the reference video content produces a plurality of reference images each corresponding to one of the sampled images, wherein each of the sample images and the reference images comprise at least one pixel, and wherein the pixel comprises a plurality of color channel values, and further comprising:
calculating color channel differences between the color channel values of the pixel in the sample image and the color channel values of a corresponding pixel in the reference image;
comparing the calculated color channel difference to a predefined color channel tolerance;
statistically combining the calculated color channel differences for the pixel in the sample image; and
comparing the statistically combined color channel differences to a predefined pixel tolerance and defining a pixel status of the pixel in the sample image as a function of the calculated color channel differences and the statistically combined color channel differences.

9. The method of claim 8, wherein determining whether the sampled input video content differs from the sampled reference video content comprises determining whether the sampled input video content differs from the sampled reference video content as a function of a tolerance value.

10. The method of claim 8, wherein defining the one or more sampling parameters comprises defining a sampling range occurring at the beginning of the video clip.

11. The method of claim 8, wherein one or more tangible computer-readable media not including a signal have computer-executable instructions for performing the method recited in claim 8.

12. One or more tangible computer-readable media not including a signal having computer-executable components stored thereon for comparing images generated by different video adapters, each of said images having a plurality of pixels associated therewith, said components comprising:
a sampler module for sampling test video content generated by the first video adapter based on sampling parameters to create a sample image, wherein the sampler module comprises a pseudo-random number generator, and wherein said sampling occurs at a timestamp generated by the pseudo-random number generator using a seed;
a pixel module for comparing characteristics of one or more of the pixels in the sample image with corresponding pixels in a reference image generated by a second video adapter, wherein the characteristics comprise color channel values;
a tolerance module for defining a pixel status for each of the pixels in the sample image based on:
comparing characteristics of one or more of the pixels in the sample image with corresponding pixels in the reference image and pre-defined difference tolerances associated therewith,
statistically combining the calculated characteristic differences, and
comparing the statistically characteristic differences to predefined pixel tolerances; and
a bitmap module for defining an image status for the sample image based on the pixel status defined by the tolerance module for each of the pixels in the sample image.

13. The computer-readable media of claim 12, further comprising a sampler module for sampling reference video content based on sampling parameters to create the reference image.

14. The computer-readable media of claim 12, wherein the color channel values correspond to one or more of the following: red, green, blue, luminance, chrominance, color-red, and color-blue.

* * * * *